(12) United States Patent
Higman

(10) Patent No.: US 9,581,279 B1
(45) Date of Patent: Feb. 28, 2017

(54) MULTI-LAYERED CONDUIT REPAIR SYSTEM

(71) Applicant: William G. Higman, St. Petersburg, FL (US)

(72) Inventor: William G. Higman, St. Petersburg, FL (US)

( * ) Notice: Subject to any disclaimer, the term of this patent is extended or adjusted under 35 U.S.C. 154(b) by 0 days.

(21) Appl. No.: 14/949,055

(22) Filed: Nov. 23, 2015

(51) Int. Cl.
| | | |
|---|---|---|
| F16L 55/16 | (2006.01) |
| F16L 55/18 | (2006.01) |
| F16L 55/1645 | (2006.01) |
| B05D 1/02 | (2006.01) |

(52) U.S. Cl.
CPC .......... F16L 55/1645 (2013.01); B05D 1/02 (2013.01)

(58) Field of Classification Search
CPC ................................................. F16L 55/1645
USPC .................................................... 138/97, 98
See application file for complete search history.

(56) References Cited

U.S. PATENT DOCUMENTS

| | | | |
|---|---|---|---|
| 3,202,562 A | | 8/1965 | Lang et al. |
| 3,261,374 A | | 7/1966 | Anderson et al. |
| 3,865,662 A | * | 2/1975 | Segal ...................... B29C 65/18 138/99 |
| 4,009,735 A | * | 3/1977 | Pinsky .................. F16L 59/022 138/147 |
| 4,776,370 A | | 10/1988 | Long, Jr. |
| 4,880,035 A | | 11/1989 | Vetter |
| 4,950,446 A | | 8/1990 | Kinumoto et al. |
| 4,976,290 A | * | 12/1990 | Gelin .................. F16L 55/1656 138/141 |
| 4,985,196 A | | 1/1991 | LeDoux et al. |
| 4,995,761 A | | 2/1991 | Barton |
| 5,049,003 A | | 9/1991 | Barton |
| 5,091,137 A | | 2/1992 | LeDoux et al. |
| 5,112,661 A | * | 5/1992 | Pendergraft ............ B29C 45/74 138/149 |
| 5,199,463 A | | 4/1993 | Lippiatt |
| 5,203,377 A | | 4/1993 | Harrington |
| 5,213,727 A | | 5/1993 | Gargiulo |
| 5,265,648 A | | 11/1993 | Lyon |
| 5,322,653 A | | 6/1994 | Muller |
| 5,346,658 A | | 9/1994 | Gargiulo |
| 5,501,248 A | | 3/1996 | Kiest, Jr. |
| 5,628,345 A | | 5/1997 | Fisco |
| 5,873,391 A | * | 2/1999 | Kittson ................. B29C 53/382 112/441 |
| 6,019,136 A | | 2/2000 | Walsh et al. |
| 6,360,780 B1 | | 3/2002 | Adolphs et al. |
| 6,701,966 B1 | * | 3/2004 | Higman ............... F16L 55/1651 138/97 |
| 6,708,729 B1 | * | 3/2004 | Smith ................. F16L 55/1656 138/124 |
| 6,755,592 B2 | * | 6/2004 | Janssen ............... F16L 55/1645 138/97 |
| 7,891,381 B2 | | 2/2011 | Anders et al. |

(Continued)

*Primary Examiner* — Paul R Durand
*Assistant Examiner* — Vishal Pancholi
(74) *Attorney, Agent, or Firm* — Larson & Larson, P.A.; Frank Liebenow; Patrick Reid

(57) ABSTRACT

A conduit repair liner includes at least two sheets of planar material that are connected to each other as pages of a book and coated with silica resin then closed against one another to form the conduit repair liner for wrapping around a carrier. The conduit repair liner includes a feature for removably affixing the conduit repair liner to the carrier during positioning within a failed conduit.

19 Claims, 9 Drawing Sheets

(56) References Cited

U.S. PATENT DOCUMENTS

| | | |
|---|---|---|
| 7,922,855 B2 | 4/2011 | Harrington |
| 8,025,461 B2 | 9/2011 | Kamiyama et al. |
| 8,118,063 B2 * | 2/2012 | Kiest, Jr. ............. F16L 55/1653 |
| | | 138/97 |
| 8,191,580 B2 | 6/2012 | Scott |
| 2002/0124898 A1 | 9/2002 | Renaud et al. |
| 2003/0234057 A1 * | 12/2003 | Woolstencroft .... F16L 55/1656 |
| | | 138/125 |
| 2006/0272724 A1 * | 12/2006 | Borland ................ F16L 55/175 |
| | | 138/99 |
| 2010/0212766 A1 | 8/2010 | Kiest, Jr. |
| 2010/0282351 A1 | 11/2010 | Kamiyama et al. |
| 2012/0145271 A1 * | 6/2012 | McKeller ............ F16L 55/1656 |
| | | 138/98 |

* cited by examiner

MULTI-LAYERED CONDUIT REPAIR SYSTEM

FIELD

The invention relates to an improved system and method for rehabilitation of a portion of a structurally damaged or leaking gravity flow system, service line, joint, etc.

BACKGROUND

Ruptures, cracks, and holes often occur in underground conduits such as sanitary sewer lines, storm sewer pipes, and other gravity flow systems and service lines. Repairing these ruptured conduits, from within, is far less expensive and less dangerous than excavating and replacing the damaged sections, as often such pipes are located in hard-to-reach locations such as beneath roadways or buildings.

One such repair method is to introduce into the conduit a polyester-fiberglass or other structural composite liner impregnated with a thermosetting resin. The liner is wrapped around and secured to an inflatable bladder which is positioned at the rupture and inflated, forcing the repair liner against the inside wall of the conduit. The impregnated composite liner adheres to the damaged inner surface of the conduit and hardens. After completion of the curing process, the bladder is deflated and removed from the conduit. Known related art include U.S. Pat. Nos. 4,995,761 and 5,049,003 to Barton, U.S. Pat. No. 5,628,345 to Fisco, U.S. Pat. No. 5,322,653 to Muller, U.S. Pat. No. 3,202,562 to Lang, et al., U.S. Pat. No. 3,261,374 to Anderson, et al., U.S. Pat. No. 4,776,370 to Long, U.S. Pat. No. 4,880,035 to Vetter, U.S. Pat. No. 4,950,446 to Kinumoto, et al., U.S. Pat. Nos. 4,985,196 and 5,091,137 to LeDoux, et al., U.S. Pat. No. 5,199,463 to Lippiatt, U.S. Pat. No. 5,203,377 to Harrington, U.S. Pat. Nos. 5,213,727 and 5,346,658 to Gargiulo, U.S. Pat. No. 5,265,648 to Lyon, U.S. Pat. No. 5,501,248 to Kies, et al., and U.S. Pat. No. 6,019,136 to Walsh, et al., the contents of U.S. Pat. No. 6,019,136 are incorporated by reference.

The methods and apparatus, for example, as described in the above cited patents provides for repairs of cracks or leaks using certain resins such as epoxy resins. Recently, it has been found advantageous to utilize a silica resin instead of the resins noted in the prior references. Although silica resin works well for such repairs, silica resin does not adhere well to liners.

What is needed is a system that will repair cracks or leaks in pipes without gaining access to the outside surfaces of the pipes (e.g. excavation), utilizing silica resin.

SUMMARY

In one embodiment, a conduit repair liner is disclosed including at least two sheets of planar material that are connected to each other as pages of a book and coated with silica resin then closed against one another to form the conduit repair liner for wrapping around a carrier. The conduit repair liner includes a feature for removably affixing the conduit repair liner to the carrier during positioning within a broken section of plumbing.

In another embodiment, a method of repairing a crack or leak in a section of plumbing is disclosed including coating a first sheet of a planar material that is included with the conduit repair liner with silica resin. The conduit repair liner has a plurality of straps, an end of each affixed at an edge of the conduit repair liner and a distal end of each has a section of hook and loop material. The method continues with coating a second sheet of the planar material that is included with the conduit repair liner with silica resin. The first sheet of the planar material connected to the second sheet of the planar material such that, after the step of coating the second sheet of the planar material, closing the second sheet of the planar material to substantially cover the first sheet of the planar material. The conduit repair liner is the wrapped around a carrier, engaging the hook and loop material to corresponding hook and loop material on a surface of the conduit repair liner to temporarily and removably hold the conduit repair liner to the carrier. The carrier and conduit repair liner are then positioned within the section of the plumbing and the carrier is inflated such that the first and second sheets of the planar material and the silica resin abuts an inside surface of the section of the plumbing. Next, the carrier is deflated the removed from the section of plumbing, leaving behind the conduit repair liner and silica resin affixed to the inside surfaces of the section of the plumbing.

In another embodiment, a conduit repair conduit repair liner has at least two sheets of a planar material for coating with silica resin and one or more straps for removably affixing the conduit repair liner to a carrier. An end of each of the straps is affixed at an edge of the conduit repair liner and a distal end of each of the plurality of straps has a section of hook and loop for removably affixing the conduit repair liner to a carrier. The at least two sheets of the planar material are connected such that, after coating with the silica resin, the at least two sheets of the planar material cover each other to form the conduit repair liner.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
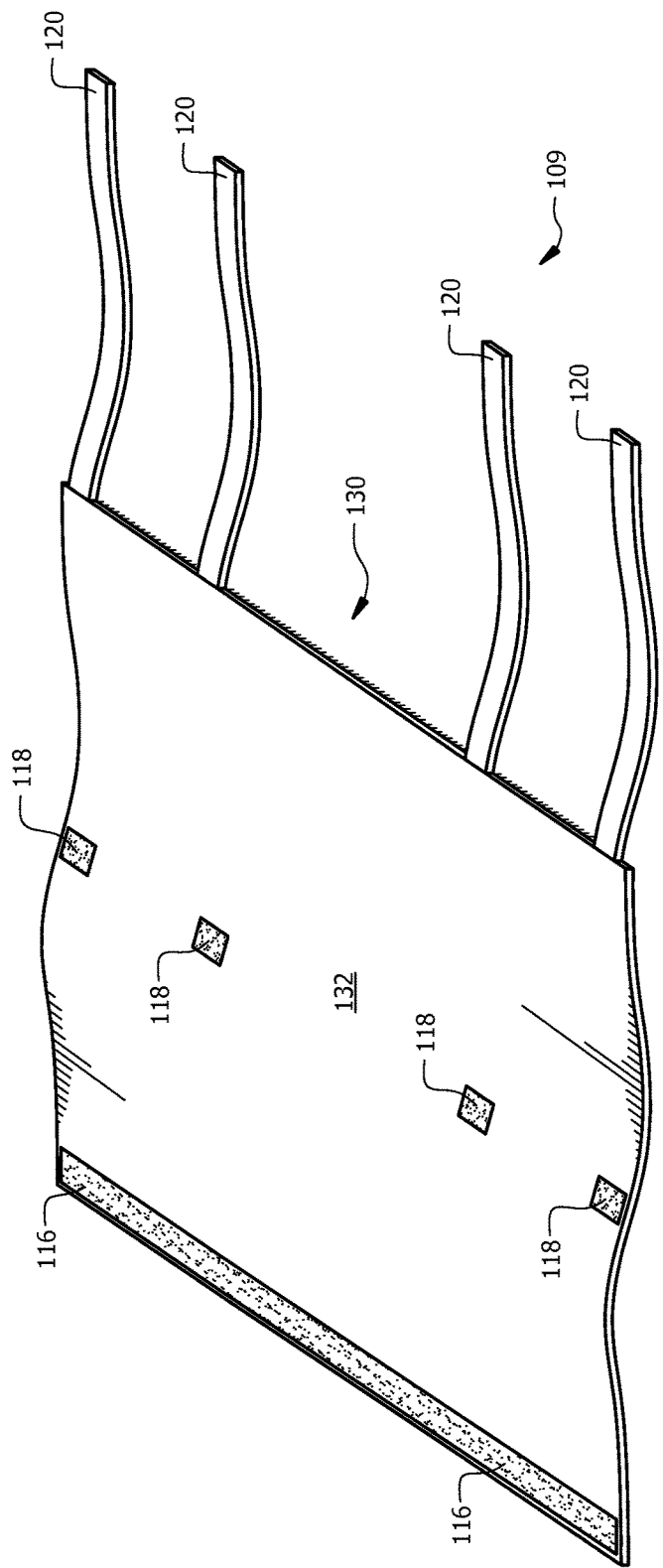
FIG. 1 illustrates a perspective view of a conduit repair system liner of the prior are.

Reference will now be made in detail to the presently preferred embodiments of the invention, examples of which are illustrated in the accompanying drawings. Throughout the following detailed description, the same reference numerals refer to the same elements in all figures.

In prior repair systems, a liner made of, for example, felt with or without woven fiberglass was saturated with epoxy resin, wrapped around a carrier, then positioned within a section of plumbing in the area of a leak or crack. The epoxy resin was absorbed by the liner, producing a thick layer of epoxy resin. After absorption, the liner was wrapped around a bladder and inserted into the failed conduit, where the bladder is inflated to force the liner with epoxy resin against the wall of the conduit, where the resin sets in approximately two hours, repairing a crack or cracks in the conduit.

Recently, it has been found that silica resin has characteristics that make silica resin desirable for such applications. Silica resin has substantial strength, low shrinkage, and a setting time of approximately two hours; all similar to epoxy resin. Silica resin has one feature that is highly desired in many applications—working time, or the amount of time before the resin begins to set. Prior resins, such as epoxy resins, have around nine minutes of working time. This means that, after mixing the two parts (resin and hardener), the installers have around nine minutes to coat the liner, wrap the coated liner around the carrier, properly position the liner and carrier in the location of the failure, and inflate the bladder. As one can imagine, for example in large conduit located beneath a highway, workers must prepare the system in a very short time; mixing the two parts (resin and hardener), quickly coating the liner, quickly wrapping the liner around the bladder, quickly positioning the bladder and liner, and quickly inflating the bladder, all before the epoxy begins to harden. This is often difficult to perform in less than nine minutes. The cure time of epoxy resin is typically around two hours.

Silica resin, having similar properties to epoxy resin, has the advantage of providing around twenty minutes of working time. That is, after the two parts of the silica resin are mixed, the silica resin doesn't begin to set for around twenty minutes, providing an additional eleven minutes, or so, for coating the liner, wrapping the liner around the bladder, positioning the bladder, and inflating the bladder.

This being said, silica resin has one pitfall-silica resin does not readily absorb into the materials used for the liner (e.g., felt and/or woven fiberglass). Therefore, using prior liner designs does not result in a repair having sufficient thickness and strength.

Referring to FIG. 1, an exemplary conduit repair liner 109 of the prior art is shown. Such a conduit repair liner 109 is used to repair pipe in situ, without requiring excavation around the pipe. Any type of pipe/plumbing is anticipated including PCV pipe, plastic pipe, iron pipe, copper pipe, etc.

Figure 9:
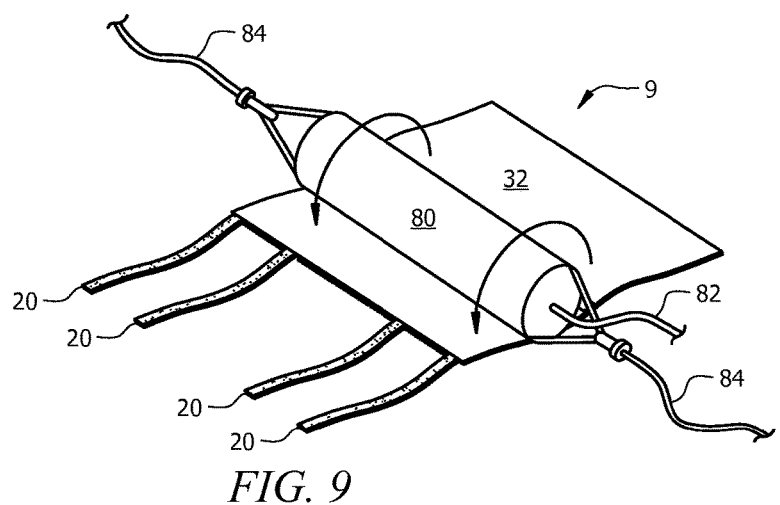
FIG. 9 illustrates a perspective view of the conduit repair system liner being impregnated in resin then wrapped around a deflated carrier.

This conduit repair liner 109 that is substantially planar and is made of materials that will soak up epoxy resin. This conduit repair system liner 109 has hook/loop material 116 at an end and a central section 130. The central section 130 typically comprises a material 132 that absorbs the resin, such as felt or felt and woven fiberglass, etc. In some liners 109 of the prior are, woven reinforcement material is included for added strength, for example, a layer of absorbent material such as felt, a layer of reinforcement material, and another layer absorbent material. Attached to this liner 109 are straps 120 that help to secure the liner 109 to a carrier similar to the carrier 80 shown in FIG. 9 after the liner 109 is saturated with epoxy resin. The straps 120 adhere to the hook and loop material patches 118 to hold the liner 109 to the carrier, but when the carrier is inflated, the bond of the hook and loop material breaks, permitting the liner 109 to expand outwardly to contact inner walls of the failed conduit 2 (see FIGS. 10A and 10B). Such a liner system 109 is sufficient for epoxy resin, but will not work well with silica resin, as silica resin does not readily absorb into the material used in this liner 30. As discussed prior, silica resin is desirable because it has a longer working time than epoxy resin.

Referring to FIGS. 2-8, several alternate liners 9 are shown. In all examples of such liners 9, similar connecting features are present to position the conduit repair system liner 9 around a carrier 80 (see FIGS. 10A and 10B). These features include one or more retaining straps 20, preferably each having pads of hook and loop material 21 for temporarily holding the liner 9 to the carrier 80. In such, after coating the conduit repair system liner sheets with silica resin, the conduit repair system liner 9 is wrapped around a carrier 80 and held to the carrier 80 by attaching the pads 21 of the retaining strap(s) 20 to one or more attachment areas 18 (see FIG. 10B). Although hook and loop material is shown, any temporary attachment mechanism is anticipated such that, when the carrier 80 expands, the temporary attachment mechanism releases to allow the liner 9 to expand to the inner diameter of the failed conduit 2.

For all examples, the planar sheets of material 32/32a/110/120/130/140/150/160/170 are anticipated to be any woven or non-woven material onto which the silica resin is applied after mixing the resin and the hardener. In a preferred embodiment, the planar sheets 32/32a/110/120/130/140/150/160/170 are made of woven roving (e.g., a continuous glass fiber roving interlaced into a heavy weight fabric). Other materials are anticipated for the planar sheets of material 32/32a/110/120/130/140/150/160/170 including, but not limited to, felt, 0/90 glass material, 0/90 fiberglass material, carbon fiber material, woven carbon fiber material, etc.

Figure 2:
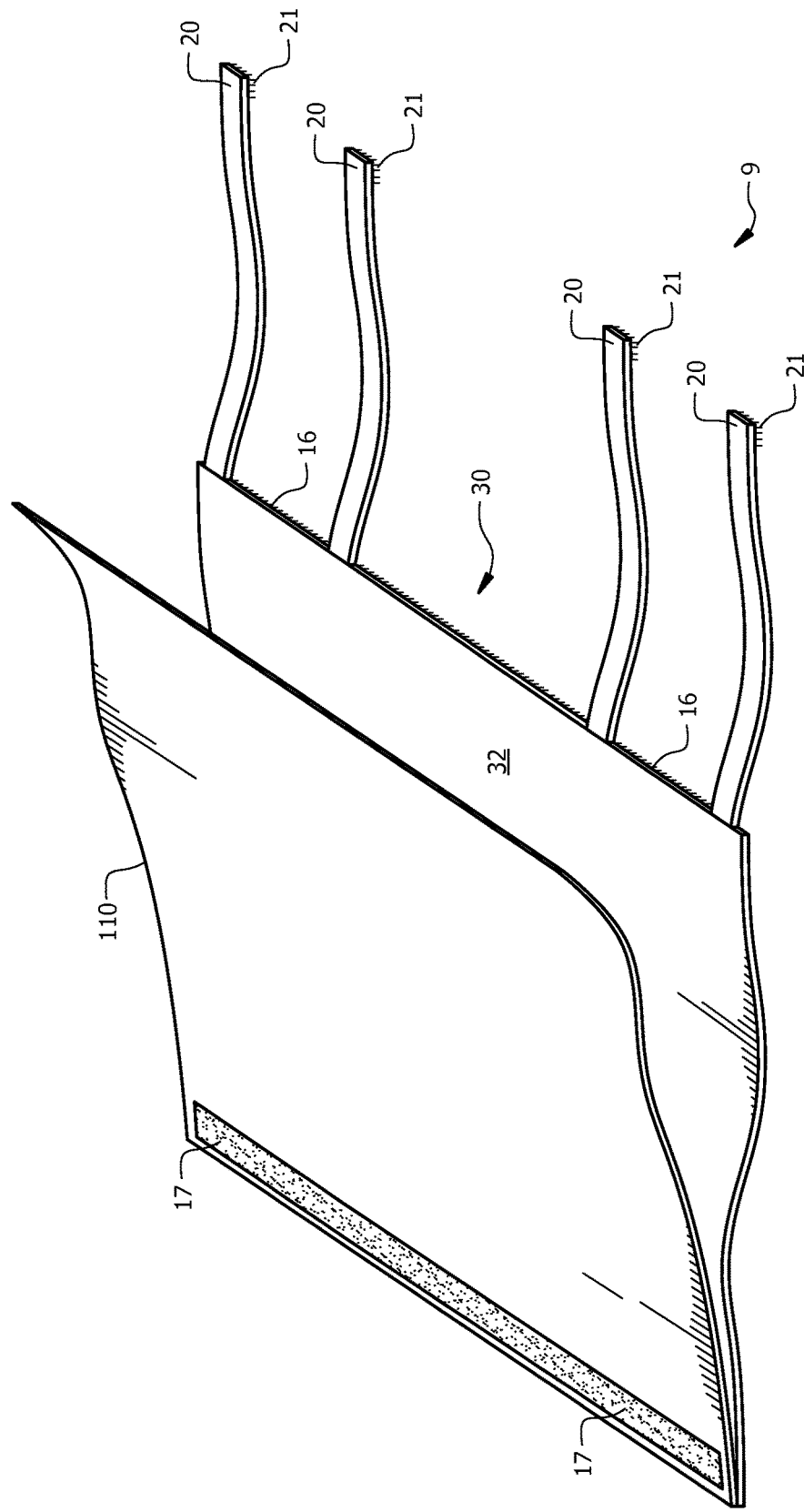
FIG. 2 illustrates a perspective view of a conduit repair system liner with two layers bound as a book along one edge.

Referring to FIG. 2 the conduit repair system liner 9 is shown in book form having two sheets of a planar material 30. A first sheet of planar material 32 is attached to the second sheet of planar material 110 along an edge. In this, the silica resin is applied to the sheets of planar material 32/110, the sheets of planar material 30 are closed (e.g. as a book is closed) and then the liner 9 is wrapped around the carrier 80 for insertion and repair of the failed conduit 2.

Figure 3:
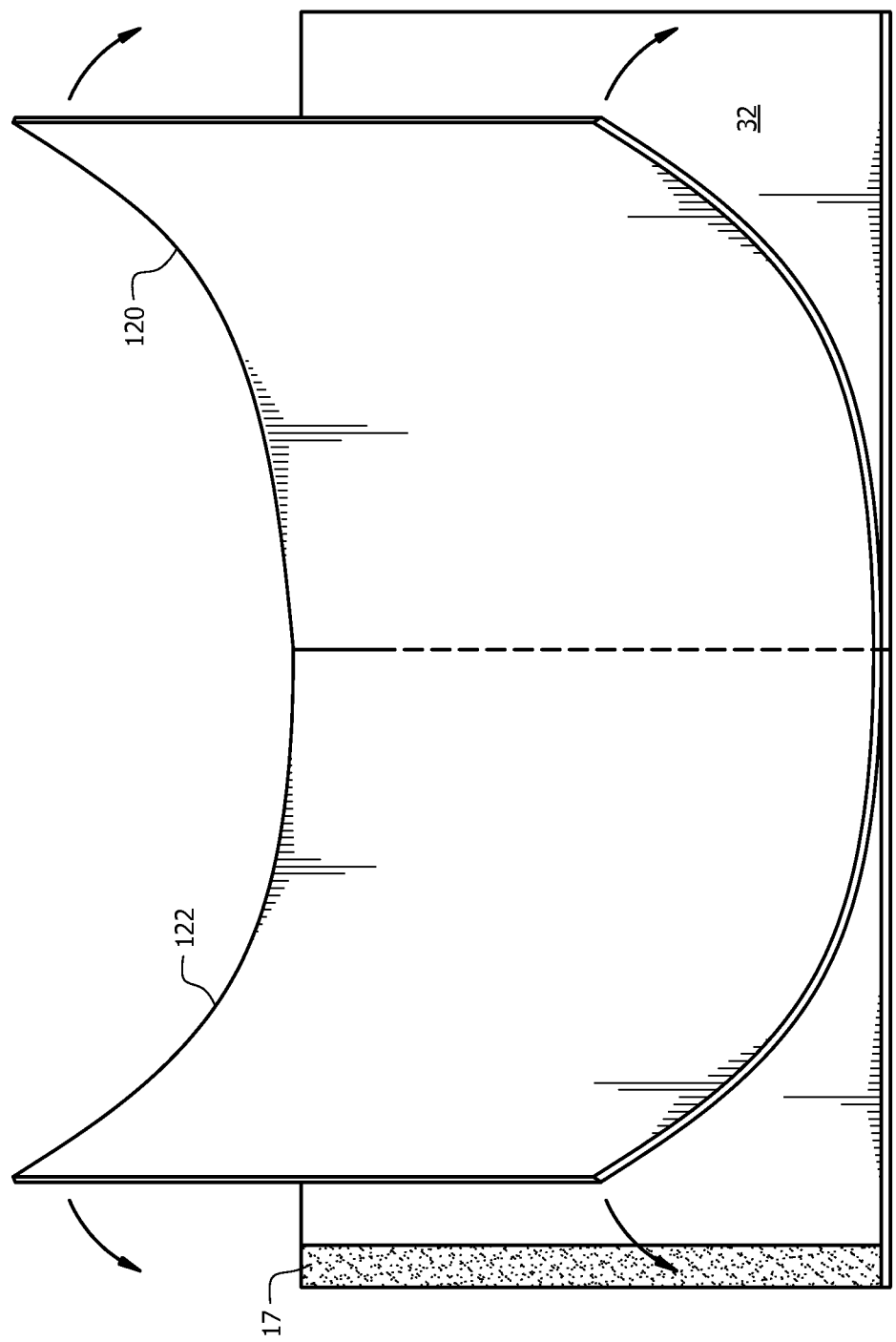
FIG. 3 illustrates a perspective view of the conduit repair system liner with two layers bound centrally along a center axis.

Referring to FIG. 3 the conduit repair system liner 9 is shown in book form having two sheets of a planar material 30. A first sheet of planar material 32 is attached to the second sheet of planar material 120 along a widthwise axis. In this, the silica resin is applied to the sheets of planar material 32/120, the sheets of planar material 30 are closed (e.g. as a book is closed) and then the liner 9 is wrapped around the carrier 80 for insertion and repair of the failed conduit 2.

Figure 4:
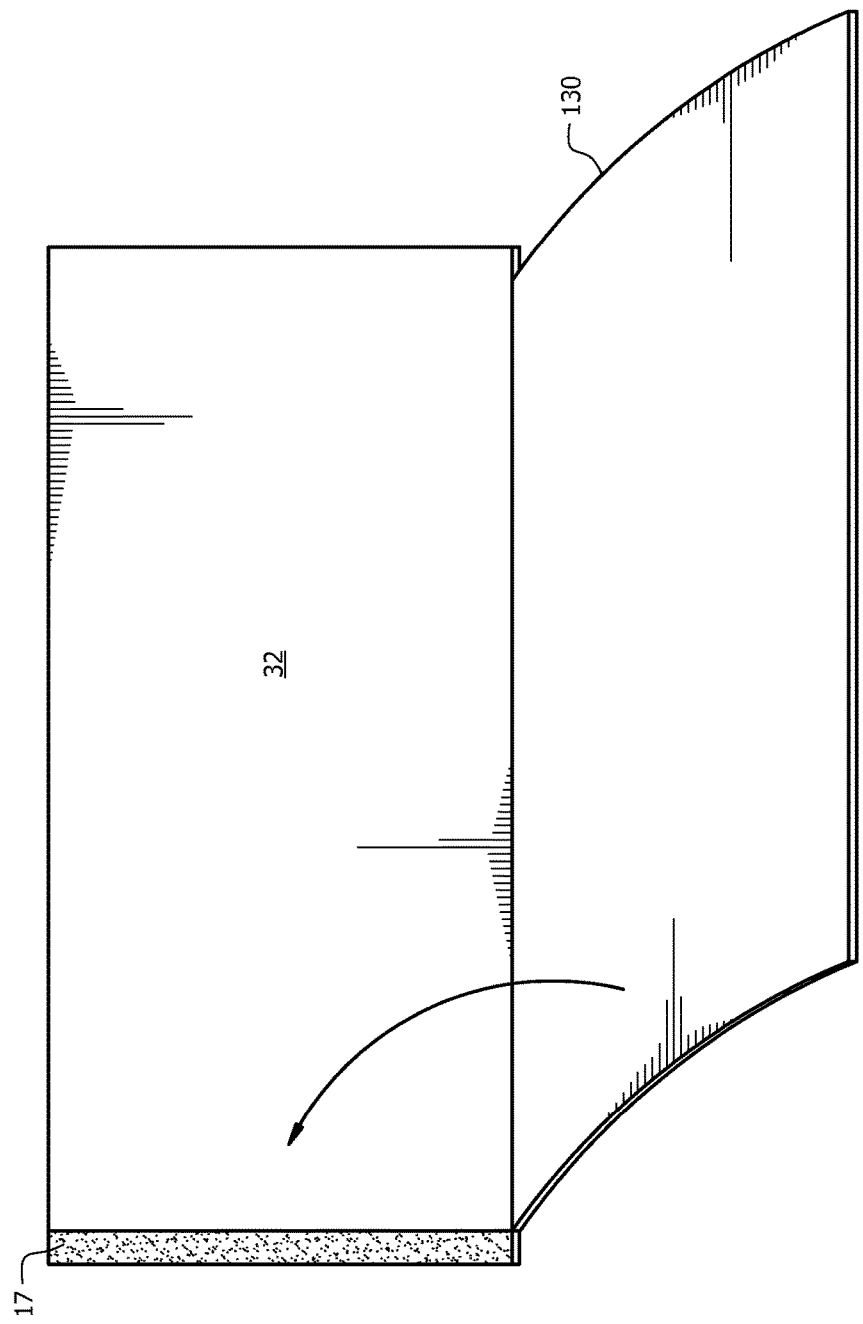
FIG. 4 illustrates a perspective view of the conduit repair system liner with two layers bound as a book along a different edge.

Referring to FIG. 4 the conduit repair system liner 9 is shown in book form having two sheets of a planar material 30. A first sheet of planar material 32 is attached to the second sheet of planar material 130 along a lengthwise edge. In this, the silica resin is applied to the sheets of planar material 32/130, the sheets of planar material 30 are closed (e.g. as a book is closed) and then the liner 9 is wrapped around the carrier 80 for insertion and repair of the failed conduit 2.

Figure 5:
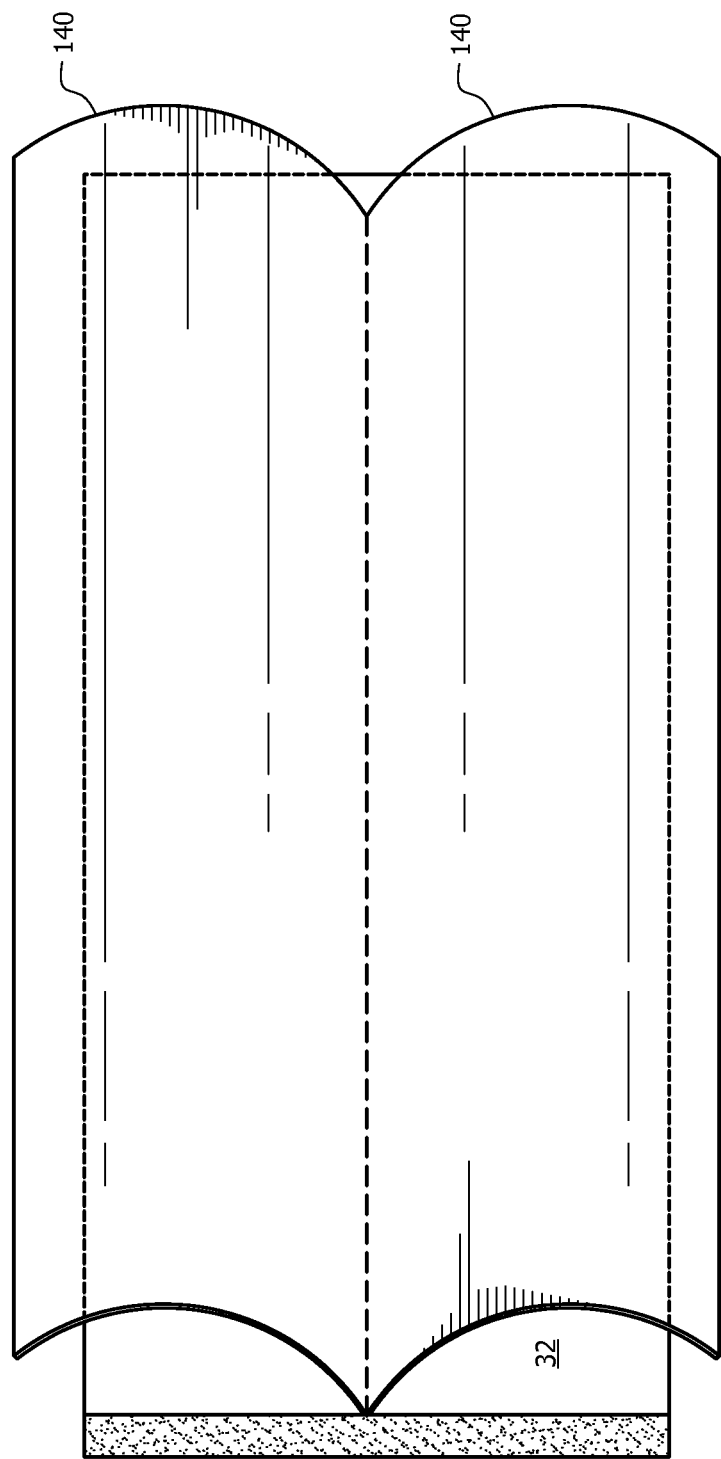
FIG. 5 illustrates a perspective view of the conduit repair system liner with two layers bound centrally along a second, center axis.

Referring to FIG. 5 the conduit repair system liner 9 is shown in book form having two sheets of a planar material 30. A first sheet of planar material 32 is attached to the second sheet of planar material 140 along a lengthwise axis. In this, the silica resin is applied to the sheets of planar material 32/140, the sheets of planar material 30 are closed (e.g. as a book is closed) and then the liner 9 is wrapped around the carrier 80 for insertion and repair of the failed conduit 2.

Figure 6:
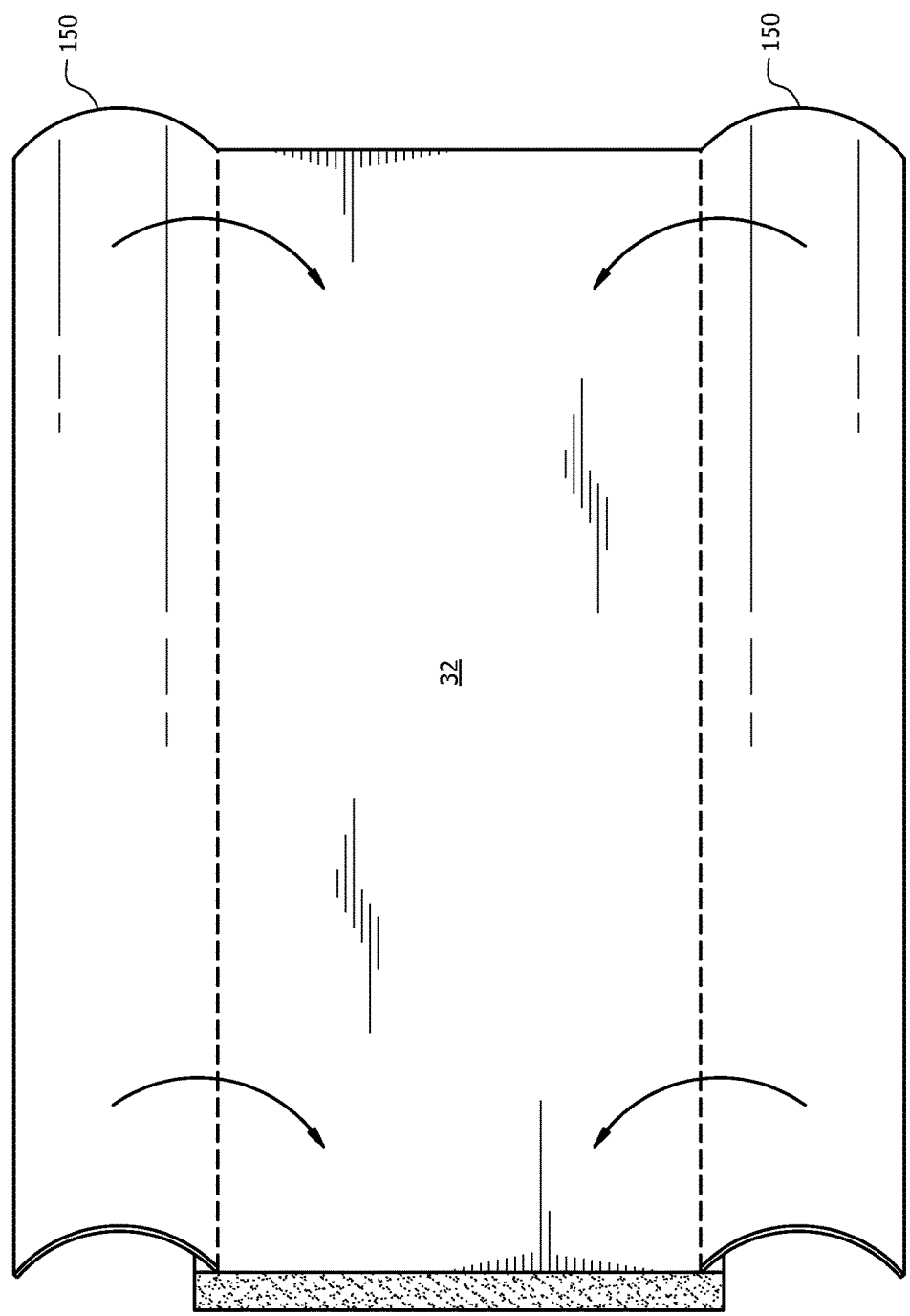
FIG. 6 illustrates a perspective view of the conduit repair system liner with two layers, the second layer in two sections bound along opposing edges.

Referring to FIG. 6 the conduit repair system liner 9 is shown in book form having two sheets of a planar material 30. A first sheet of planar material 32 is attached to half-sections of the second sheet of planar material 150 along two lengthwise edges. In this, the silica resin is applied to the sheets of planar material 32/150, the sheets of planar material 30 are closed (e.g. as a book is closed) and then the liner 9 is wrapped around the carrier 80 for insertion and repair of the failed conduit 2.

Figure 7:
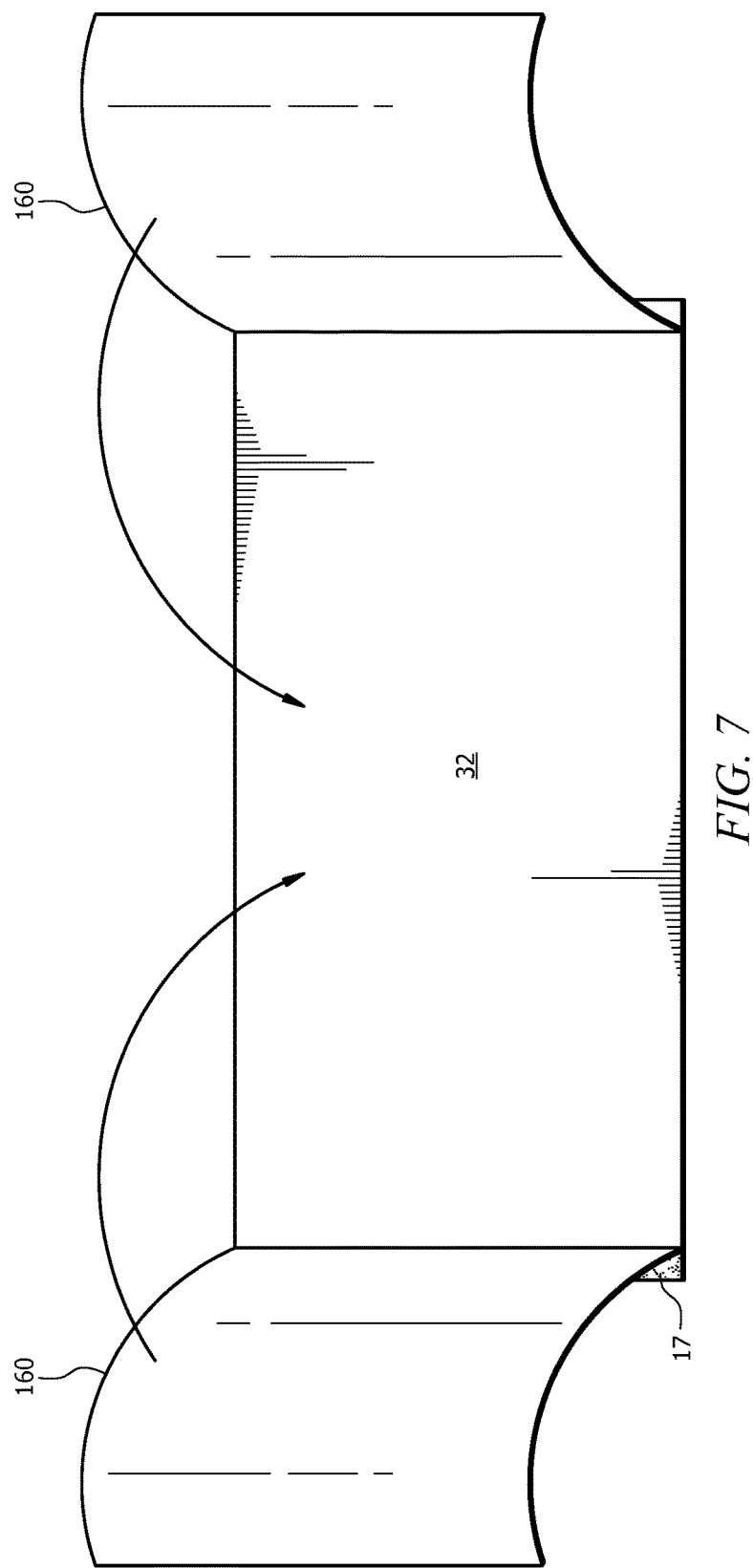
FIG. 7 illustrates a perspective view of the conduit repair system liner with two layers, the second layer in two sections bound along other opposing edges.

Referring to FIG. 7 the conduit repair system liner 9 is shown in book form having two sheets of a planar material 30. A first sheet of planar material 32 is attached to half-sections of the second sheet of planar material 160 along two widthwise edges. In this, the silica resin is applied to the sheets of planar material 32/160, the sheets of planar material 30 are closed (e.g. as a book is closed) and then the liner 9 is wrapped around the carrier 80 for insertion and repair of the failed conduit 2.

Figure 8:
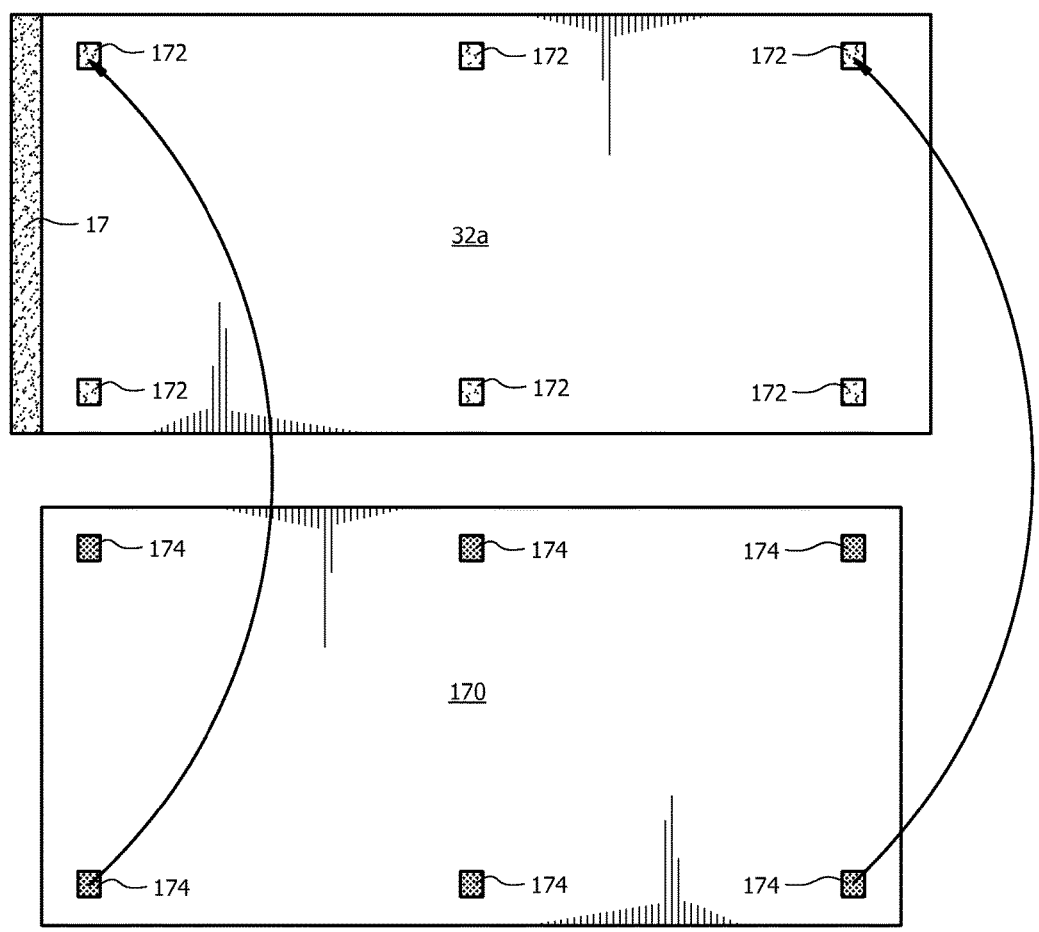
FIG. 8 illustrates a perspective view of the conduit repair system liner with two layers, the second layer being separate from the first layer, but attachable by hook and loop pads.

Referring to FIG. 8 the conduit repair system liner 9 is shown in book form having two sheets of a planar material 30. A first sheet of planar material 32 is separate from the second sheet of planar material 170. In this, the silica resin is applied to the sheets of planar material 32/170, then the sheets of planar material 30 are overlaid and connected by fasteners 172/174 (e.g., hook and loop material), and then the liner 9 is wrapped around the carrier 80 for insertion and repair of the failed conduit 2.

Note that although two sheets of planar material 30 are shown in the examples, it is fully anticipated to include additional sheets as required for the intended application.

Also note that in embodiments in which the sheets of planar material 30 are attached to each other, the attachment is made in any way known in the industry, including, but not limited to, stitching, adhesives, fasteners, etc. In some embodiments, the sheets of planar material are of a single sheet that is folded sharply.

As described, with any of the above examples, the sheets of the conduit repair system liner 30 are coated with silica resin 3 (see FIG. 10B) before installation into a failed conduit 2. In some methods of installation, the silica resin 3 is poured and spread over the sheets 30 of the conduit repair system liner 9, substantially covering such, for example, using a spreader (not shown). In some embodiments, the silica resin 3 is sprayed onto the conduit repair system liner 9. After the conduit repair system liner 9 is coated with the silica resin 3, the conduit repair system liner 9 is wrapped around a carrier 80 and secured using the one or more retaining straps 20 that are affixed to one or more attachment areas 18, thereby temporarily holding the conduit repair system liner 9 to the carrier 80. By whatever temporary retainment mechanism, it is preferred that the conduit repair system liner 9 be substantially covered with the silica resin 3.

The carrier 80 preferably includes positioning mechanisms 84 for moving the carrier 80 within the plumbing failed conduit 2 and an inflation tube 82. The positioning mechanisms 84 are any device used to properly position the carrier 80 at the locale of the failure, including, but not limited to ropes, cables, push rods, etc. The method of installation of the conduit repair system liner 9 using the carrier 80 is shown in FIGS. 10A and 10B, though it is fully anticipated that the conduit repair system liner 9 be used with other types of carrier systems and using other methods that may or may not use the described carrier 80.

Figure 10A:
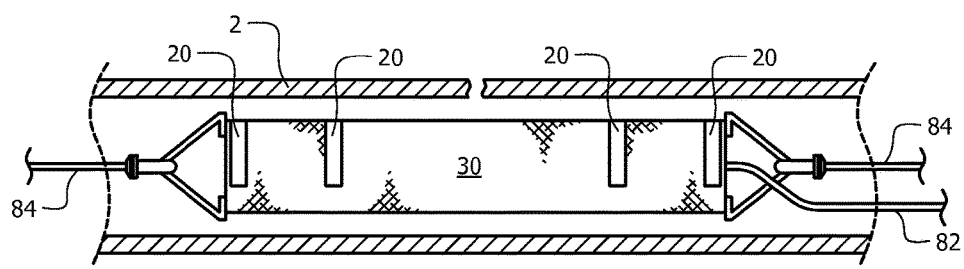
FIG. 10A illustrates a cross-sectional view of the conduit repair system liner wrapped around a deflated carrier and pulled into place within a conduit.
Figure 10B:
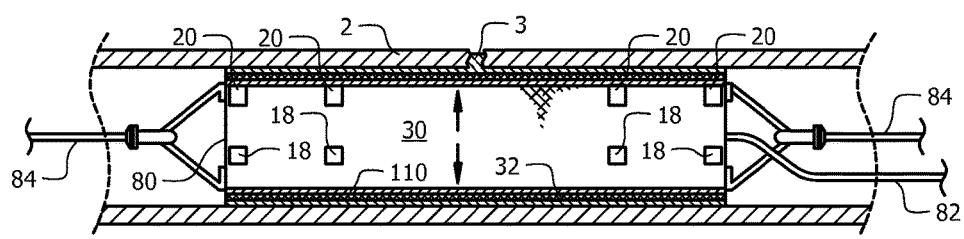
FIG. 10B illustrates a cross-sectional view of the conduit repair system liner wrapped around a now inflated carrier in place within the conduit.

Referring to FIGS. 10A and 10B, views of the conduit repair system liner 9 during installation within a failed conduit 2. After the conduit repair system liner 9 is coated with silica resin 3, the conduit repair liner 9 is wrapped around the carrier 80. The conduit repair system liner 9 and the carrier 80 are positioned within the failed conduit 2 as shown in FIG. 10A, by, for example, pulling/pushing using the positioning lines 84. Note, that the method shown of positioning the conduit repair system liner 9 and the carrier 80 are examples as it is anticipated that the conduit repair system liner 9 functions with other methods of positioning, all of which are included here within. Note that there is a crack or leak in the failed conduit 2.

Once the conduit repair system liner 9 and the carrier 80 are in position, the inflatable carrier 80 is inflated as shown in FIG. 10B. The inflation tube 82 expands the conduit repair system liner 9 and forces the conduit repair system liner 9 to stretch, overcoming the holding action of the removable fasteners 21/18 which are shown fastened in FIG. 10A and detached in FIG. 10B. The conduit repair system liner 9 and the silica resin 3 contacts the inside surface of the failed conduit 2. Note that some of the silica resin 3 has filled the crack in the failed conduit. Substantially the entire conduit repair system liner 9 (coated with the silica resin 3) rests against the inner walls of the failed conduit 2 in the area of the crack/leak. After or just before curing, the carrier 80 is deflated (or evacuated if necessary) and pulled out of the repair area of the failed conduit 2, leaving the conduit repair system liner 9 affixed to the inside walls of the failed conduit 2 (not shown). Once the failed conduit cures (sets), the failed conduit 2 has similar or superior structural support, as required by, for example, plumbing beneath roadways, etc.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:
1. A conduit repair liner comprising:
   at least two sheets of planar material that are connected along a single edge and disconnected along the remaining edges, each of the at least two sheets of planar material are for coating with silica resin on both sides of each of the at least two sheets of planar material and for closing the at least two sheets of planar material against one another after the coating; and
   means for removably affixing the conduit repair liner to a carrier for insertion into a failed conduit.

2. The conduit repair liner of claim 1, wherein the at least two sheets of planar material is exactly two sheets of the planar material.

3. The conduit repair liner of claim 1, wherein the single edge is a widthwise edge of the at least two sheets of planar material.

4. The conduit repair liner of claim 1, wherein the single edge is a widthwise axis of the at least two sheets of planar material.

5. The conduit repair liner of claim 1, wherein a lengthwise edge of the at least two sheets of planar material.

6. The conduit repair liner of claim 2, wherein a second sheet of the exactly two sheets of the planar material is in two substantially equally sized sections and a first sheet of the exactly two sheets of material is affixed to each of the sections along a lengthwise axis of the conduit repair liner.

7. The conduit repair liner of claim 2, wherein a second sheet of the exactly two sheets of the planar material is in two substantially equally sized sections and a first section of the two substantially equally sized sections is affixed to a first sheet of the exactly two sheets of the planar material along a first lengthwise edge of the conduit repair liner and a second section of the two substantially equally sized sections is affixed to the first sheet of the exactly two sheets of the planar material along an opposing lengthwise edge of the conduit repair liner.

8. The conduit repair liner of claim 2, wherein a second sheet of the exactly two sheets is in two substantially equally sized sections and a first section of the two substantially equally sized sections is affixed to a first sheet of the exactly two sheets of the planar material along a first widthwise edge of the conduit repair liner and a second section of the two substantially equally sized sections is affixed to the first sheet of the exactly two sheets of the planar material along an opposing widthwise edge of the conduit repair liner.

9. The conduit repair liner of claim 2, wherein a first sheet of the exactly two sheets of the planar material is affixed to a second sheet of the exactly two sheets of the planar material along by a plurality of corresponding patches made of hook and loop material.

10. The conduit repair liner of claim 1, wherein the planar material comprises woven roving.

11. The conduit repair liner of claim 1, wherein the planar material comprises 0/90 glass material.

12. The conduit repair liner of claim 1, wherein the planar material comprises 0/90 fiberglass material.

13. The conduit repair liner of claim 1, wherein the planar material comprises carbon fiber material.

14. The conduit repair system of claim 1, wherein the conduit repair liner further comprises two end sections and each of the end sections comprises a layer of felt stitched to a layer of woven fiberglass, the woven fiberglass being bias-cut.

15. The conduit repair system of claim 1, wherein the means for removably affixing to the carrier is a plurality of straps, an end of each of the straps affixed to an edge of the conduit repair liner and a distal end of each of the plurality of straps has a section of hook and loop material that mates to a corresponding section of hook and loop material that is affixed to one of the surfaces of the conduit repair liner.

16. A method of repairing a crack or leak in a section of plumbing, the method comprising:
    coating a first sheet of a planar material that is included with a conduit repair liner with silica resin, the conduit repair liner having a plurality of straps, an end of each of the straps at an edge of the conduit repair liner and a distal end of each of the plurality of straps has a section of hook and loop material;
    coating a second sheet of the planar material that is included with the conduit repair liner with silica resin, the first sheet of the planar material connected to the second sheet of the planar material along a single edge such that, after the step of coating the second sheet of the planar material, closing the second sheet of the planar material to substantially cover the first sheet of the planar material;
    wrapping the conduit repair liner around a carrier, engaging the hook and loop material to corresponding hook and loop material on a surface of the conduit repair liner;
    positioning the carrier and conduit repair liner within the section of the plumbing;
    inflating the carrier such that the first and second sheets of the planar material and the silica resin abuts an inside surface of the section of the plumbing;
    deflating the carrier; and
    removing the carrier, leaving the conduit repair liner and silica resin affixed to the inside surfaces of the section of the plumbing.

17. The conduit repair liner of claim 16, wherein the planar material comprises woven roving.

18. A conduit repair liner comprising:
    at least two sheets of a planar material for coating with silica resin, each of the at least two sheets of planar material connected to the other sheets of planar material at exactly one edge;
    one or more straps for removably affixing the conduit repair liner to a carrier, an end of each of the straps affixed at an edge of the conduit repair liner and a distal end of each of the plurality of straps having a section of hook and loop for removably affixing the conduit repair liner to a carrier;
    wherein, after coating each of the at least two sheets of planar material with the silica resin, the at least two sheets of the planar material cover each other to form the conduit repair liner.

19. The conduit repair liner of claim 1, wherein the at least two sheets of planar material is exactly two sheets of the planar material.

* * * * *